United States Patent [19]

Bianco et al.

[11] Patent Number: 5,233,658

[45] Date of Patent: Aug. 3, 1993

[54] METHOD AND MEANS TO LIMIT ACCESS TO COMPUTER SYSTEMS

[76] Inventors: James S. Bianco, 217 Brainard Rd.; James T. Madsen, 106 Old Town Rd., both of Enfield, Conn. 06082; Michael Ceppetelli, 42 Skinner Rd., Broadbrook, Conn. 06016; John S. Fahy, 192 Regency Park, Agawam, Mass. 01101

[21] Appl. No.: 680,429

[22] Filed: Apr. 4, 1991

Related U.S. Application Data

[62] Division of Ser. No. 520,763, May 9, 1990, Pat. No. 5,067,155.

[51] Int. Cl.$^5$ ............................................. H04K 1/00
[52] U.S. Cl. .................................... 380/25; 380/4; 382/7; 235/449; 70/276
[58] Field of Search .............. 235/449, 450; 70/276; 382/7; 380/25, 4

[56] References Cited

U.S. PATENT DOCUMENTS

| | | | |
|---|---|---|---|
| 3,154,761 | 10/1964 | O'Gorman | 235/450 |
| 3,465,131 | 9/1969 | Eyck | 235/450 |
| 3,564,214 | 2/1971 | Cooper | 235/450 |
| 3,896,292 | 7/1975 | May et al. | 235/450 |
| 4,112,292 | 9/1978 | Varvel et al. | 235/449 |
| 4,213,039 | 7/1980 | Schasser | 235/449 |
| 4,253,017 | 2/1981 | Whitehead | 235/449 |
| 4,414,821 | 11/1983 | Perkut | 70/276 |
| 4,629,875 | 12/1986 | Uemura | 235/450 |
| 4,879,645 | 11/1989 | Tamada et al. | 380/4 |
| 4,907,268 | 3/1990 | Bosen et al. | 380/4 |
| 5,014,325 | 5/1991 | Moritomo | 382/7 |
| 5,083,309 | 1/1992 | Beysson | 380/4 |

*Primary Examiner*—David Cain
*Attorney, Agent, or Firm*—John H. Crozier

[57] ABSTRACT

In a preferred embodiment, a method of limiting access to computer systems which method includes scrambling identification card information with time information so that the resulting code can be used for only a limited period of time, thus preventing unauthorized persons from using the code at a later time. In another aspect of the invention, one or more μ-metal shields are embedded in an identification card, thus identifying the card as being valid and also providing means to indicate when a valid card is being removed from a card reader.

21 Claims, 2 Drawing Sheets

METHOD AND MEANS TO LIMIT ACCESS TO COMPUTER SYSTEMS

This application is a U.S. division of application Ser. No. 07/520,763, filed May 9, 1990, now U.S. Pat. No. 5,067,155, issued Nov. 19, 1991.

BACKGROUND OF THE INVENTION

1. Field of the Invention

The present invention relates to electronic computer systems generally and, more particularly, to a novel method and means of limiting access to such computer systems and especially those systems which require the input of a security code, or password, as part of the procedure to access such systems.

2. Background Art

Electronic data bases are widely used in a broad range of activities and typically are maintained in various memory devices of computer systems. Such data bases may be used for work-in-process control in manufacturing, pricing and inventory control in selling, ticket issuance, and data storage in research, to name only a very small number of actual uses. Often, and especially in larger data systems, the computer system in which the data bases are maintained has included in it a number of CRT terminals which may be used to both input and access data to and from the memory devices. This arrangement greatly facilitates the operation of an organization by allowing rapid input and access by a number of persons. While this is advantageous, there are many situations in which it is desired to limit access to the data bases and programs to only those persons to whom such access is authorized.

Conventionally, access to data bases is limited by means of having a potential user type in a security code at one of the CRT terminals to "unlock" access to the data bases. A problem with this method is that an unauthorized person may simply observe the keys pressed to enter the security code. As an alternative method, the potential user may insert a personal identification card with a bar code, magnetic code, or other coded identification in a slot card reader. One problem with either method is that, later, an unauthorized person can simply put the CRT terminal in "TEST MODE" to read the security code and then use the security code to gain access to the data bases. It is therefore necessary to ensure that the security code is deleted, or the terminal locked out, whenever the authorized person leaves the terminal. Frequently, the program requires that the user log out when finished, but often the users forget to log out. One conventional technique to achieve automatic log out is to have a "time out" period built into the computer program with which the terminal is locked out after a predetermined interval of time during which there has been no entry on the keyboard. A disadvantage of this technique is that the "time out" period must be set fairly long to allow for slow users or users may stop to think for a period of time in excess of the "time out" period. Another problem with the foregoing methods is that the authorized person may give his security code to the unauthorized person.

A further problem with methods which employ an identification card with the security code encrypted on it in bar code form is that the card may simply be copied by conventional photocopying techniques or, if the bar code is encrypted according to standard symbologies, it may be forged through the use of a standard bar code printer.

Another problem with computer access could arise in situations in which one person would be required to "sign in" on a CRT terminal each time an event occured. One such situation is with "paperless inspections" in which it would be desirable to avoid the large amount of paperwork required. For example, if an airplane is being repaired, an inspector would inspect each repair, access a host computer through a CRT terminal using his coded identification card, and then enter data indicating that the repair had been satisfactorily made and inspected. Another such situation is one which requires a supervisor to authorize the ordering of parts each time parts are ordered. Here, it would be desirable that the supervisor acess a host computer in the same way as the above inspector and then indicate that the ordering of a part is authorized. A problem with either of the two foregoing example situations is that the inspector or supervisor may want to avoid the inconvenience of having to continually go to the CRT terminal and access the host computer and may, therefore, simply log in to the host computer, remove his identification card, and allow the mechanic, the parts person, or others to enter data into the host computer. The card cannot be left in the card reader because it is needed as a personal identification card for the presence of, or access by, the inspector or supervisor in or to secured areas.

The foregoing problem can be eliminated by detecting when the identification card is removed from the reader by optically detecting the passage of a bar code, for example, and immediately terminating access to the host computer, but this method of detection can be foiled by a person inserting a piece of paper in the reader slot before removing the identification card. Thus, the reader continues to output a signal to the CRT terminal indicating that the card is still in the slot.

Accordingly, it is a principal object of the present invention to provide a method and means for eliminating manual entry of security codes while defeating the use of a security code by an unauthorized person.

It is an additional object of the invention to provide a method and means to prevent tampering with an identification card reader and detecting when an identification card has been removed from a reader.

It is a further object of the invention to provide a method and means to check the validity of an identification card and to prevent copying or forging of the card.

It is another object of the invention to provide a method and means to prevent copying or forging of a transmission to a host computer.

Yet an additional object of the invention is to provide any of such methods and means which can be easily retrofitted to existing systems with minor hardware changes and little or no changes to existing host computer software.

Other objects of the present invention, as well as particular features and advantages thereof, will be elucidated in, or be apparent from, the following description and the accompanying drawing figure.

SUMMARY OF THE INVENTION

The present invention achieves the above objects, among others, by providing, in a preferred embodiment, a method of limiting access to computer systems which method includes scrambling identification card information with time information so that the resulting code can be used for only a limited period of time, thus preventing unauthorized persons from using the code at a later time. In another aspect of the invention, one or more μ-metal shields are embedded in an identification card, thus identifying the card as being valid and also providing means to indicate when a valid card is being removed from a card reader.

BRIEF DESCRIPTION OF THE DRAWING

The invention will be better understood if reference is made to the accompanying drawing figures, in which.

DETAILED DESCRIPTION OF THE PREFERRED EMBODIMENTS

Figure 1:
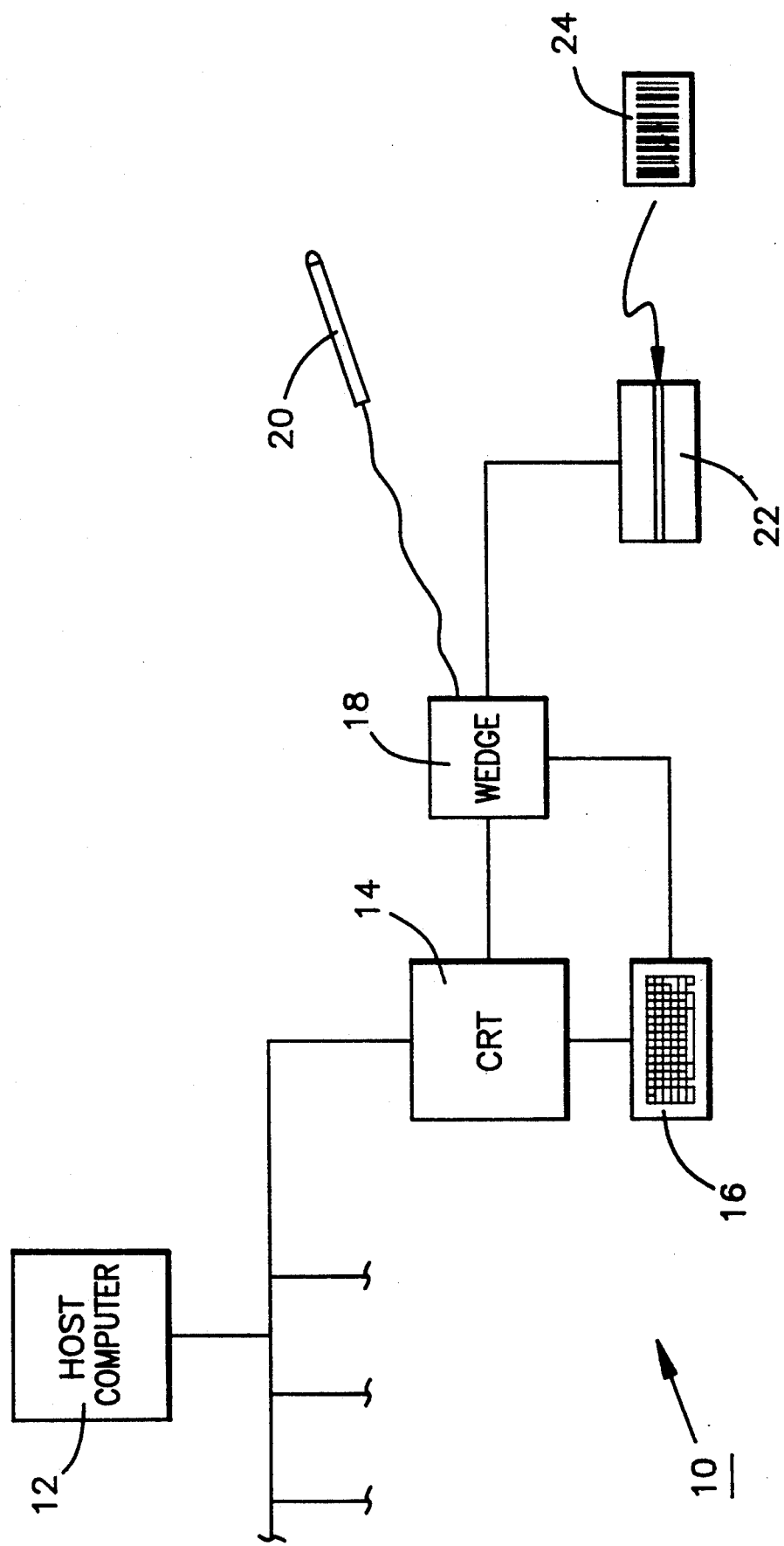
FIG. 1 is a schematic diagram of a computer system including one aspect of the present invention.

Referring now to the Drawing, FIG. 1 schematically illustrates a data base input/retrieval system or the like, generally indicated by the reference numeral 10, which includes the present invention. System 10 includes a host computer 12, in the memory of which it maybe assumed that a data base is stored. Connected to host computer 12 are one or more CRT terminals 14 (only one shown) each with an associated keyboard 16. Connected to CRT terminal 14 is a wedge, or keyboard emulator, 18 to which is connected data input devices, here, for illustrative purposes, a bar code reader wand 20 and a slot card reader/decoder 22. Slot card reader/decoder 22 may be of the type which reads bar codes on cards inserted therein or it may be of the type which reads magnetic codes embedded in cards. The former type of card is illustrated as identification card 24. The purpose of keyboard emulator 18 is to provide an input to host computer 12 which the host computer reads as an input from the keyboard, without having to change the software in the host computer for different input devices. Keyboard emulator 18 is also connected to keyboard 16 to lock the keyboard unless an identification card 24 is inserted into reader/decoder 22. Identification card 24 may be any type of identification card, but it is preferably one that includes an encrypted security code such as that described in U.S. application Ser. No. 07/338,373, filed Apr. 13, 1989, by James S. Bianco, titled IDENTIFICATION MEANS WITH ENCRYPTED SECURITY CODE AND METHOD OF MAKING AND USING SAME, the disclosure of which application is made a part hereof by reference. Using such an identification card increases the degree of security.

In many cases, access to the data bases in host computer 12 is freely available to anyone who uses CRT terminal 14. Data may be inputted through keyboard 16 or by means of reading a bar code with wand 20. Likewise, data may be retrieved by inputting the appropriate commands on keyboard 16. In other cases, that, in conventional systems, a and it is in these cases, that, in conventional systems, a potential user may be required to enter a unique security code on keyboard 16 or to enter the code by means of inserting identification card 24 into slot card reader/decoder 22, or both the entry of a security code and the insertion of an identification card may be required. When host computer 12 receives the security code, it provides access to the data bases. As noted above, a substantial limitation of the conventional systems is that, after the authorized user leaves CRT terminal 14, an unauthorized person can put the CRT terminal in "TEST MODE", read the security code, and use the security code later for unauthorized access to the data bases.

The present invention defeats this mode of unauthorized access as follows: Reader/decoder 22 is programmed to scramble the security code, using conventional encoding techniques, the scrambling algorithm changing as a function of the current date and time. Host computer 12 is likewise programmed to decode the scrambled security code, with the unscrambling algorithm changing, in the same manner, as a function of the date and the time. The algorithms may change at the end of any selected interval of time, say, each hour or even each minute. Host computer 12 is programmed to accept scrambled codes in a time interval somewhat greater than the time interval of changes to avoid rejecting a potential authorized user at the point of change. If an "out-of-date" code is received, host computer 12 is programmed to not unlock CRT terminal 14, since the code was probably copied by an unauthorized user. The unauthorized user can still read the scrambled code on CRT terminal 14 in the manner described above, but the code is valid only for a limited period of time and, if the length of that period of time is selected to be short enough, having the scrambled code would be of no value to the unauthorized user.

The answer of the present invention to the problem of leaving a host computer accessed while removing an identification card from a reader will now be described with reference to FIGS. 2 and 3. On FIG. 2, there is shown an identification card 4 bearing a bar code 42. Again, identification card 40 is preferably of the type described in the above-referenced U.S. Patent Application. Embedded in card 40 are either or both of foil μ-metal shields 44 and 46, the shields being provided to block passage of magnetic flux through the portions of card 40 where they are embedded.

Figure 3:
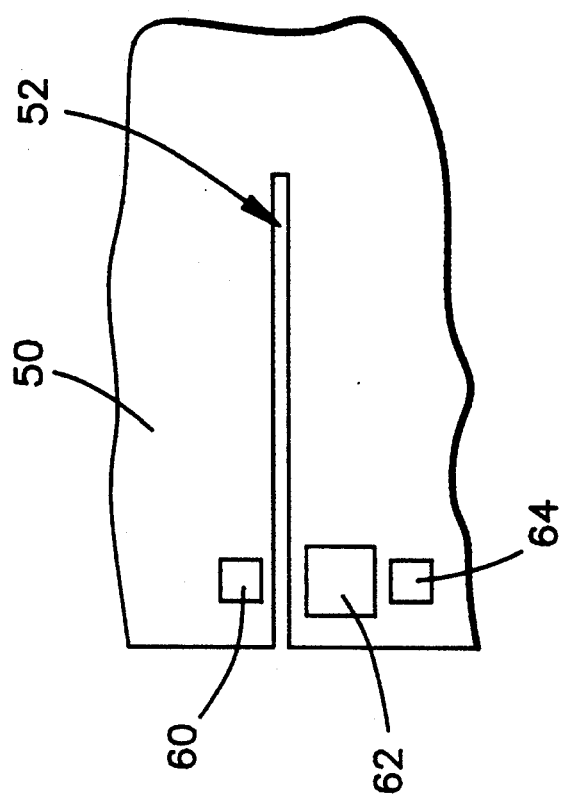
FIG. 3 is a fragmentary schematic representation of a slot bar code reader for use with the identification card of FIG. 2.
Figure 2:
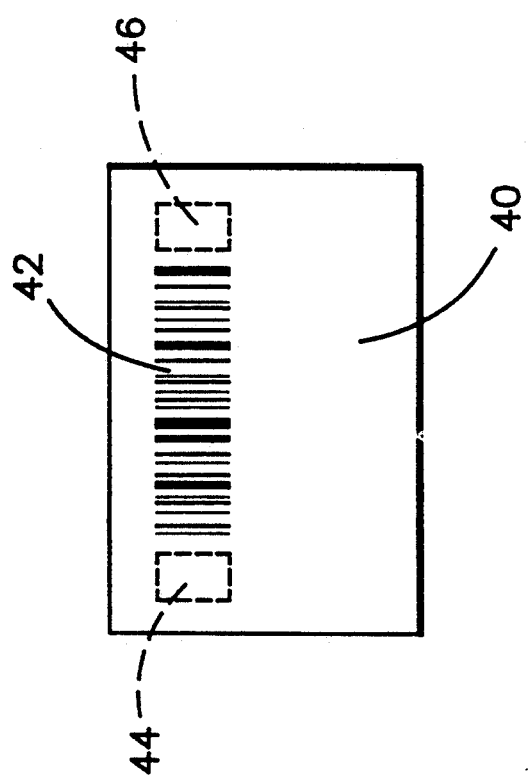
FIG. 2 is a side elevation view of an identification card bearing a bar code and including another aspect of the present invention.

Referring now to FIG. 3, there is shown a slot bar code insertion reader 50 having a slot 52 formed therein for the insertion of card 40 (FIG. 2). Disposed on one side of slot 52 is a magnet 6 and disposed on the other side of the slot, opposite magnet 60, is a Hall effect sensor 62 which detects the presence or absence of flux from the magnet.

In use, when identification card 40 is inserted into slot 52, assuming that shield 46 is present, sensor 62 will first detect when the card is inserted and then again when it is withdrawn, by virtue of shield 46 interrupting the flux from magnet 60 to the sensor. If shield 44 is present, the flux will be interrupted anytime that card 40 is inserted in reader 50. The failure of sensor 62 to detect the presence of shields 44 and/or 46 will indicate that a valid card is not being used and the reader can then be locked out from reading the invalid card.

The use of shield 44 alone is not entirely satisfactory, since one could slip a piece of foil μ-metal in slot 52 before removing card 40. However, with the use of shield 46, that technique would not work, since inserting the piece of foil μ-metal when removing card 40 would simply provide indication that the card was being removed.

Another technique to foil the detection system could be to dispose a strong magnet (not shown) near sensor 62 to mask the second signal. As a countermeasure, a second sensor 64 is placed near sensor 62 to detect a strong magnetic field, that being stronger than the one produced by magnet 60.

It will be understood that conventional electronic circuitry is employed to use the signals from sensor 62 to permit reading of a bar code, to interrupt bar code reading, to lock out CRT terminal 14 (FIG. 1), and/or alert supervisory personnel.

The latter aspect of the present invention can also be employed with the type of slot reader having a slot in which an identification card is inserted at one end of the slot and removed at the other end of the slot. Here, the detection of the presence of a μ-metal shield would indicate that a valid type of card is being used, so that forged cards could be rejected. Preferably, the detection of the presence of the shield would have to occur within a short interval of time before or after the card is read, in order to reduce the opportunity for tampering.

The μ-metal shields described above can be inserted by conventional methods in the bodies of the cards during the manufacture of the cards.

It can be seen, then, that the use of a μ-metal shield in an identification card prevents the copying of the identification card by conventional means, since the absence of the shield will be detected by the readers of the present invention. Use of the specifically encrypted security code prevents forging of the card, since the special code is not dicipherable without a special reader.

Furthermore, it can be seen that, according to the present invention, removal of an identification card from a card reader will lock out the terminal system and that employment of the reader of the present invention with cards containing μ-metal shields prevents tampering with the reading system.

Additionally, time domain encryption of an identification code prevents duplication of a transmitted security code, while the use of a specially encrypted security code prevents forging of the transmitted security code.

It will further be appreciated that any of the aspects of the present invention can easily be incorporated into existing computer systems by relatively simple reprogramming and minor equipment changes.

It will thus be seen that the objects set forth above, among those made apparent from the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A method of terminating access to a computer system, comprising:
   (a) providing a mu-metal shield at a selected location in an identification card;
   (b) providing a slot card insertion reader having disposed therewithin a source of magnetic flux and a first magnetic flux sensor disposed to detect the flow of said magnetic flux thereto and to produce an output signal indicative of the presence of said flow, said source of magnetic flux and said first magnetic flux sensor being disposed such that, upon insertion of said card in said slot card reader, said mu-metal shield will interrupt said flow of magnetic flux to said sensor;
   (c) inserting said card in said card reader, thereby permitting access to said computer;
   (d) determining when said card is withdrawn from said slot card reader by detecting when said flow of magnetic flux is interrupted for a first interval upon insertion of said card in said slot card insertion reader and for a second interval upon removal of said card from said slot card insertion reader, said flow of magnetic flux being detected between said first and second intervals, and the determination of when said card is withdrawn occurs after the second resumption of said magnetic flux flow; and
   (e) terminating said access to said computer system when said magnetic flux detection is resumed.

2. A method, as defined in claim 1, wherein said flow of magnetic flux is interrupted throughout the time said card is inserted in said slot card insertion reader.

3. A method of terminating access to a computer system, comprising:
   (a) providing a mu-metal shield at a selected location in an identification card;
   (b) providing a slot card insertion reader having disposed therewithin a source of magnetic flux and a first magnetic flux sensor disposed to detect the flow of said magnetic flux thereto and to produce an output signal indicative of the presence of said flow, said source of magnetic flux and said first magnetic flux sensor being disposed such that, upon insertion of said card in said slot card reader, said mu-metal shield will interrupt said flow of magnetic flux to said sensor;
   (c) inserting said card in said card reader, thereby permitting access to said computer;
   (d) determining when said card is withdrawn from said slot card reader by detecting the resumption of said magnetic flux detection by said first sensor after the interruption thereof;
   (e) providing in said slot card insertion reader a second magnetic flux sensor to detect the presence of a strong magnetic field, stronger than that produced by said source of magnetic flux; and
   (e) terminating said access to said computer system either when said magnetic flux detection is resumed or when said strong magnetic field is detected.

4. A method, as defined in claim 3, wherein said flow of magnetic flux is interrupted throughout the time said card is inserted in said slot card insertion reader.

5. A method, as defined in claim 3, wherein said card includes an identification code in the form of a bar code and wherein said bar code includes:
   (a) a first decipherable code containing first information encrypted according to a standard symbology;
   (b) a second dicipherable code containing second information encrypted according to a unique symbology, said second information including at least a portion of said first information;
   (c) said first decipherable code being decipherable with either a standard decoding reader or a unique decoding reader; and
   (d) said second decipherable code being decipherable only with said unique decoding reader.

6. A method, as defined in claim 5, wherein:
   (a) said first decipherable code is an identification code; and (b) said second decipherable code is a security code.

7. A slot card reader for permitting access to a computer system in response to a card inserted therein, said card having a mu-metal shield at a selected location in said card, said slot card reader comprising:
(a) a source of magnetic flux;
(b) a magnetic flux sensor to detect the flow of said magnetic flux thereto and to produce an output signal indicative of the presence of said flow;
(c) said source of magnetic flux and said magnetic flux sensor being disposed within said slot card reader such that, upon insertion of said card in said reader, said mu-metal shield will interrupt said flow of magnetic flux to said sensor, thereby indicating the validity of said card; and
(d) means to permit access to said computer system when said card is determined to be valid; and wherein said card includes an identification code in the form of a bar code and wherein said bar code comprises:
(e) a first decipherable code containing first information encrypted according to a standard symbology;
(f) a second decipherable code containing second information encrypted according to a unique symbology, said second information including at least a portion of said first information;
(g) said first decipherable code being decipherable with either a standard decoding reader or a unique decoding reader; and
(h) said second decipherable code being decipherable only with said unique decoding reader.

8. A slot card reader, as defined in claim 7, wherein:
(a) said first decipherable code is an identification code; and
(b) said second decipherable code is a security code.

9. A slot card insertion reader for terminating access to a computer system when an identification card has been removed therefrom, said card having a mu-metal shield at a selected location in said card, said slot card insertion reader comprising:
(a) a source of magnetic flux;
(b) a first magnetic flux sensor to detect the flow of said magnetic flux thereto and to produce an output signal indicative of the presence of said flow;
(c) said source of magnetic flux and said first magnetic flux sensor being disposed within said slot card reader such that, upon insertion of said card in said reader, said mu-metal shield will interrupt said flow of magnetic flux to said first sensor for a first interval, and, upon removal of said card from said slot card insertion reader, said mu-metal shield will interrupt said flow of magnetic flux for a second interval, after which said flow of flux will resume, thereby indicating that said card has been withdrawn; and
(d) means to terminate access to said computer system when said flow of flux resumes.

10. A slot card insertion reader, as defined in claim 9, wherein said flow of magnetic flux is interrupted throughout the time said card is inserted in said slot card insertion reader.

11. A slot card insertion reader for terminating access to a computer system when an identification card has been removed therefrom, said card having a mu-metal shield at a selected location in said card, said slot card insertion reader comprising:
(a) a source of magnetic flux;
(b) a first magnetic flux sensor to detect the flow of said magnetic flux thereto and to produce an output signal indicative of the presence of said flow;
(c) said source of magnetic flux and said first magnetic flux sensor being disposed within said slot card reader such that, upon insertion of said card in said reader, said mu-metal shield will interrupt said flow of magnetic flux to said first sensor, and, upon removal of said card from said slot card insertion reader, said flow of flux will resume, thereby indicating that said card has been withdrawn;
(d) a second magnetic flux sensor to detect the presence of a strong magnetic field, stronger than that produced by said source of magnetic flux; and
(e) means to terminate access to said computer system either when said flow of flux resumes or when said strong magnetic field is detected.

12. A slot card insertion reader, as defined in claim 11, wherein said flow of magnetic flux is interrupted throughout the time said card is inserted in said slot card insertion reader.

13. A slot card insertion reader, as defined in claim 11, wherein said card includes an identification code in the form of a bar code and wherein said bar code includes:
(a) a first decipherable code containing first information encrypted according to a standard symbology;
(b) a second decipherable code containing second information encrypted according to a unique symbology, said second information including at least a portion of said first information;
(c) said first decipherable code being decipherable with either a standard decoding reader or a unique decoding reader; and
(d) said second decipherable code being decipherable only with said unique decoding reader.

14. An identification card for use with a slot card reader for determining the validity of identification cards, said card reader including a source of magnetic flux, a magnetic flux sensor to detect the flow of said magnetic flux thereto and to produce an output signal indicative of the presence of said flow, and said source of magnetic flux and said magnetic flux sensor being disposed within said slot card reader such that, upon insertion of an identification card, having a mu-metal shield disposed at a selected location in said card, in said reader, said mu-metal shield will interrupt said flow of magnetic flux to said sensor, thereby indicating the validity of said card, said identification card comprising a mu-metal shield disposed at said selected location; and said identification card including an identification code in the form of a bar code and wherein said bar code includes:
(a) a first decipherable code containing first information encrypted according to a standard symbology;
(b) a second decipherable code containing second information encrypted according to a unique symbology, said second information including at least a portion of said first information;
(c) said first decipherable code being decipherable with either a standard decoding reader or a unique decoding reader; and
(d) said second decipherable code being decipherable only with said unique decoding reader.

15. An identification card, as defined in claim 14, wherein:
(a) said first decipherable code is an identification code; and (b) said second decipherable code is a security code.

16. An identification card for use with a slot card insertion reader for determining when an identification card has been removed therefrom, said slot card insertion reader including a source of magnetic flux, a first magnetic flux sensor to detect the flow of said magnetic flux thereto and to produce an output signal indicative of the presence of said flow, said source of magnetic flux and said first magnetic flux sensor being disposed within said slot card reader such that, upon insertion of an identification card, having a mu-metal shield disposed at a selected location in said card, in said slot card insertion reader, said mu-metal shield will interrupt said flow of magnetic flux to said first sensor, and, upon removal of said card from said slot card insertion reader, said flow of flux will resume, thereby indicating that said card has been withdrawn, said identification card comprising a mu-metal shield disposed at said selected location; and said identification card including an identification code in the form of a bar code and wherein said bar code includes:

(a) a first decipherable code containing first information encrypted according to a standard symbology;

(b) a second decipherable code containing second information encrypted according to a unique symbology, said second information including at least a portion of said first information;

(c) said first decipherable code being decipherable with either a standard decoding reader or a unique decoding reader; and (d) said second decipherable code being decipherable only with said unique decoding reader.

17. An identification card, as defined in claim 16, wherein:

(a) said first decipherable code is an identification code; and (b) said second decipherable code is a security code.

18. A method, as defined in claim 1, wherein said card includes an identification code in the form of a bar code and wherein said bar code includes:

(a) a first decipherable code containing first information encrypted according to a standard symbology;

(b) a second decipherable code containing second information encrypted according to a unique symbology, said second information including at least a portion of said first information;

(c) said first decipherable code being decipherable with either a standard decoding reader or a unique decoding reader; and (d) said second decipherable code being decipherable only with said unique decoding reader.

19. A method, as defined in claim 18, wherein:

(a) said first decipherable code is an identification code; and (b) said second decipherable code is a security code.

20. A slot card insertion reader, as defined in claim 9, wherein said card includes an identification code in the form of a bar code and wherein said bar code includes:

(a) a first decipherable code containing first information encrypted according to a standard symbology;

(b) a second decipherable code containing second information encrypted according to a unique symbology, said second information including at least a portion of said first information;

(c) said first decipherable code being decipherable with either a standard decoding reader or a unique decoding reader; and (d) said second decipherable code being decipherable only with said unique decoding reader.

21. A slot card insertion reader, as defined in claim 20, wherein:

(a) said first decipherable code is an identification code; and (b) said second decipherable code is a security code.

* * * * *